United States Patent
Wang et al.

(10) Patent No.: US 8,184,536 B2
(45) Date of Patent: May 22, 2012

(54) APPARATUS AND METHOD FOR ERROR CONCEALMENT FOR A DIGITAL WIRELESS PHONE

(75) Inventors: Weifeng Wang, Shanghai (CN); Zhengheng Zhou, Shanghai (CN); Caogang Yu, Shanghai (CN)

(73) Assignee: Beken Corporation, Shanghai (CN)

( * ) Notice: Subject to any disclaimer, the term of this patent is extended or adjusted under 35 U.S.C. 154(b) by 847 days.

(21) Appl. No.: 12/257,185

(22) Filed: Oct. 23, 2008

(65) Prior Publication Data

US 2009/0303980 A1    Dec. 10, 2009

(30) Foreign Application Priority Data

Jun. 6, 2008   (CN) .......................... 2008 1 0043450

(51) Int. Cl.
- *G01R 31/08* (2006.01)
- *H04W 4/00* (2009.01)
- *H04J 3/00* (2006.01)
- *H04B 7/212* (2006.01)
- *G06F 11/00* (2006.01)

(52) U.S. Cl. ...................................................... 370/231

(58) Field of Classification Search .............. 370/231, 370/232, 332, 333, 337, 347; 714/704; 455/403, 455/462, 463
See application file for complete search history.

(56) References Cited

U.S. PATENT DOCUMENTS

| | | | | |
|---|---|---|---|---|
| 7,016,329 B2 * | 3/2006 | Padovani et al. | ............... | 370/332 |
| 7,130,657 B1 * | 10/2006 | Sampath et al. | ............... | 455/561 |
| 7,133,364 B2 * | 11/2006 | Park | ............................. | 370/231 |
| 2005/0013249 A1 * | 1/2005 | Kong et al. | .................... | 370/235 |
| 2005/0243714 A1 * | 11/2005 | Moon | ............................ | 370/216 |

FOREIGN PATENT DOCUMENTS

CN    1856786 A    11/2006

OTHER PUBLICATIONS

Chai, Jie, "Research of Replica Selection Strategies of Data Grid," Apr. 1, 2007.

* cited by examiner

*Primary Examiner* — Ricky Ngo
*Assistant Examiner* — Paul H Masur
(74) *Attorney, Agent, or Firm* — Perkins Coie LLP; Aaron Wininger

(57) ABSTRACT

When there are unused data slots available, a system allocates redundant slots in a data frame to a single mobile unit. A receiving device calculates a quality of slot (QoS) score for each slot that it receives data for. After the QoS score is calculated, the system calculates a Quality of Audio Segment (QoAS) score for each individual segment. It does so by comparing the individual audio segments that were received. Segments that are identical are assigned a positive score, while segments that differ get no score. The QoAS for each segment is added to the QoS for the slot the segment was transmitted in to generate the total score. The system then chooses the segment with the highest total score. If the total score is above a specified threshold, the system outputs the segment to the next component. Otherwise, it outputs a mute segment.

7 Claims, 9 Drawing Sheets

US 8,184,536 B2

APPARATUS AND METHOD FOR ERROR CONCEALMENT FOR A DIGITAL WIRELESS PHONE

CROSS-REFERENCE TO RELATED APPLICATION

This application claims priority to Chinese Patent Application No. 200810043450.3, filed Jun. 6, 2008, the disclosure of which is hereby incorporated by reference in its entirety.

BACKGROUND

Protecting a signal from corruption is a significant problem for data transmission systems. In particular, noise is a major factor in corrupting data signals. In wireless telephone systems such as cordless phones or cellular phones, particular problems include fading (e.g. multipath fading) and white noise. A challenge in dealing with noise is that these sources produce different error patterns. For example, white noise tends to result in single bit errors randomly scattered. On the other hand, in a fading channel, errors will more often come in bursts. Digital error detection and correction techniques can mitigate many of these errors. However, it is hard to protect against both random and bursty errors. At the same time, in many cordless phone systems, not all of the available bandwidth is actually used. Therefore, it would be useful to have a way to mitigate transmission errors while also taking full advantage of the available transmission resources.

DETAILED DESCRIPTION

A method and system to conceal transmission errors in a digital wireless system is disclosed (hereinafter referred to as the "error concealment system" or the "system"). The system is used in the uplink or the downlink of a cordless or wireless TDMA system. When there are unused data slots available, the system allocates redundant timeslots in a data frame to a single mobile unit. The mobile unit uses the timeslots to transmit multiple (redundant) copies of the data that would otherwise be transmitted in a single timeslot. The receiving device calculates a quality of slot (QoS) score for each received timeslot. The device calculates the QoS score by adding the quality score for the slot's synchronization field, the slot's data field, and each of the slot's audio segments. The score is determined by evaluating the CRC of each of the segments and by comparing the synchronization field to the expected value. If the information indicates a correct transmission, the field is assigned a score of one. If the information indicates an incorrect transmission, the field is assigned a score of zero. After the QoS is calculated, the system calculates a Quality of Audio Segment (QoAS) score for each individual segment. It does so by comparing the individual audio segments that were received. Segments that are identical are assigned a positive score, while segments that differ get no score. The system then calculates the QoAS score by adding the score for each segment to the QoS for the slot in which the segment was transmitted. The system then chooses the segment with the highest QoAS score. If the total score is above a specified threshold, the system outputs the segment to the next component. Otherwise, it outputs an empty segment. In a cordless telephone system, this is equivalent to muting the audio for the duration of the dropped segment.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
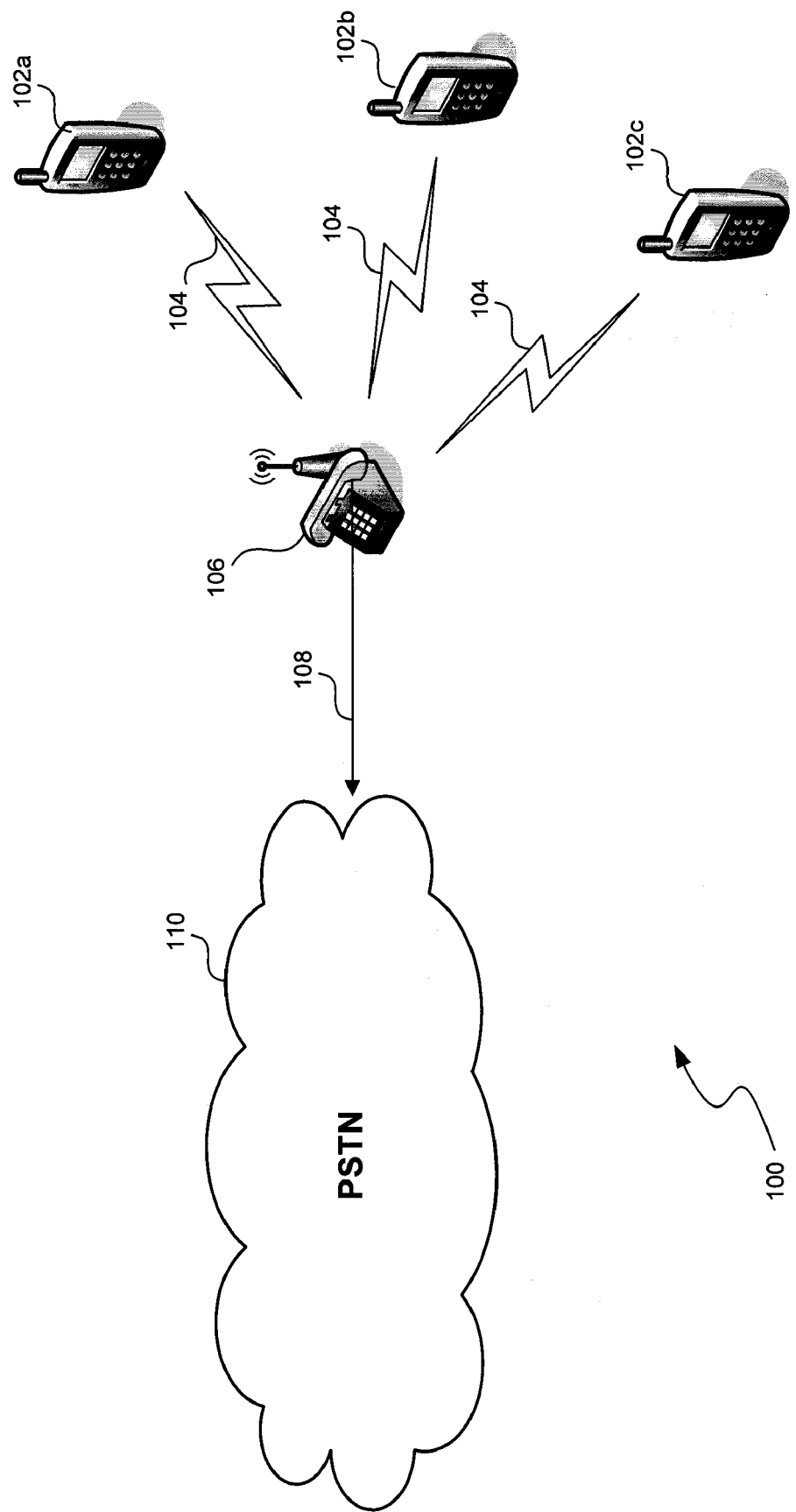
FIG. 1 is a diagram of a representative environment in which an error concealment system operates.

FIG. 1 is a block diagram of an environment 100 in which an error concealment system operates. The environment includes cordless telephone handsets 102*a-c*, which are connected to a cordless telephone base station 106 through a wireless connection 104. The wireless connection 104 could be implemented using any system for transmitting data in a digital format, such as the Digital Enhanced Cordless Telephone (DECT) standard for cordless phone communication. The cordless telephone handsets 102*a-c* and the cordless telephone base station 106 include digital components to receive and process the audio signal. The cordless telephone base station 106 connects through a wired connection 108 to a telephone network 110. In the embodiment shown in FIG. 1, the telephone network 110 is the public switched telephone network (PSTN), but the base station could also connect to a private branch exchange (PBX) or to a packet-switched network providing Voice over Internet Protocol (VoIP) services. Similarly, the wireless connection 104 and the wired connection 110 could be either wired or wireless connections. In general, any communications system could benefit from the error concealment system.

Figure 2:
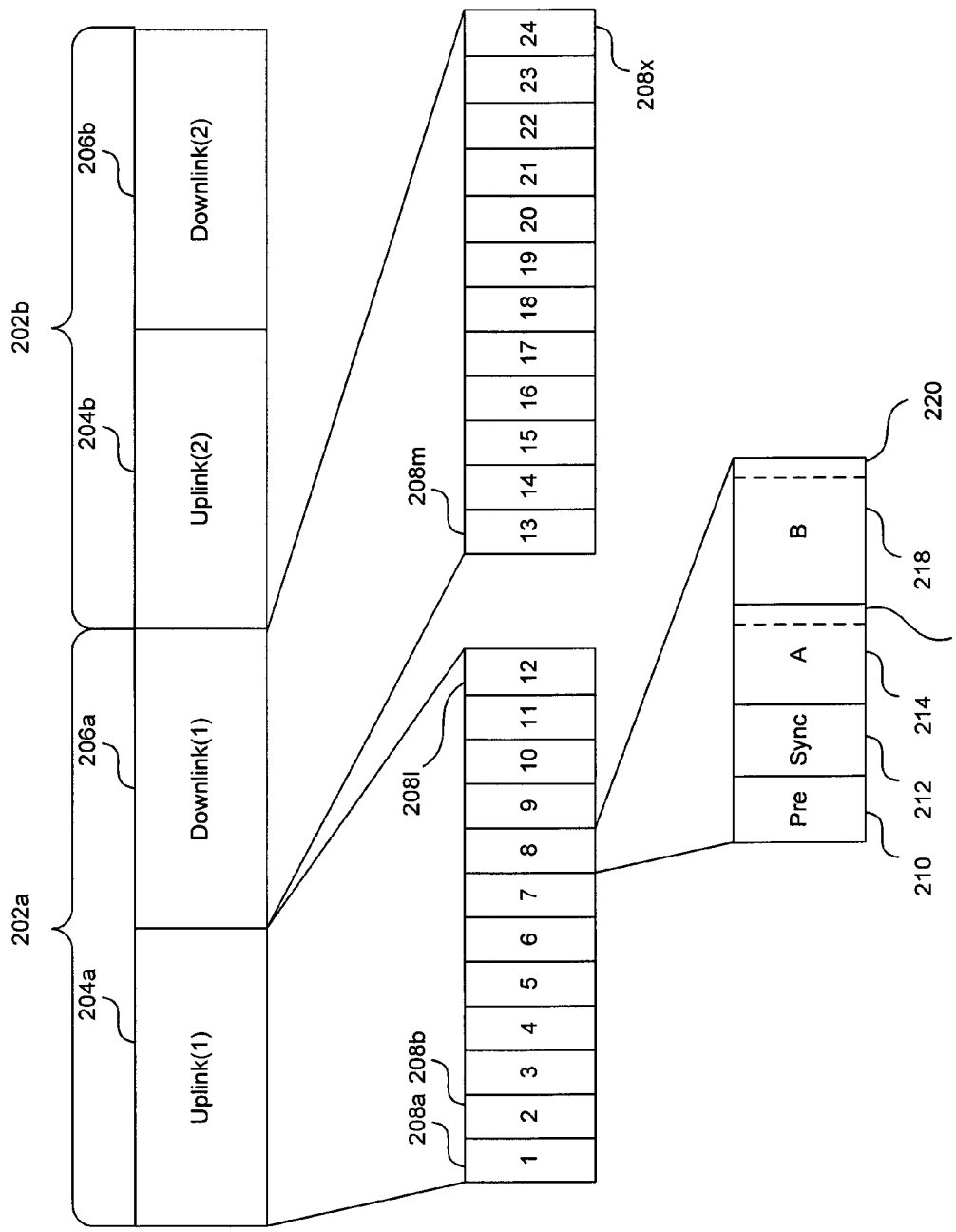
FIG. 2 is a diagram of a prior art TDD/TDMA data frame in a wireless data system.

FIG. 2 is a diagram showing two data frames of a prior art time division duplexing (TDD)/Time Division Multiple Access (TDMA) wireless system. TDMA and TDD are applications of Time Division Multiplexing (TDM), in which two or more signals are transmitted over a single channel by dividing the use of the channel over time. A TDD system achieves the effect of a full duplex system by using a half-duplex configuration. A TDMA system allows multiple handsets to share a single channel by allocating each handset a time period (called a timeslot) during which it is permitted to transmit. FIG. 2 shows the frame structure used by the DECT system. However, one skilled in the art will appreciate that a similar frame structure is used in many systems, such as systems using the Global System for Mobile communications (GSM) standard. FIG. 2 shows two data frames 202a and 202b, which are each 1 ms long. The system divides the 1 ms of the first data frame 202a into an uplink time portion 204a and a downlink time portion 206a and divides the second data frame 202b into an uplink time portion 204b and a downlink time portion 206b. The cordless telephone handsets 102a-c transmit data to the cordless telephone base station 110 during uplink time portions 204a and 204b. The uplink time portion 204a is divided into 12 timeslots 208. The cordless telephone base station 106 allocates each timeslot 208 separately to a cordless telephone handset 102a-c. Similarly, the cordless telephone base station 106 uses the downlink time portions 206a and 206b to transmit data to the cordless telephone handsets 102a-c. The downlink time portions 206a and 206b are also divided into timeslots. Each timeslot is assigned to a particular cordless telephone handset 102a-c, which listens to transmissions from the cordless telephone base station 106 only during that timeslot.

In a cordless telephone system, the length of a timeslot 208 is chosen to provide the cordless telephone handsets 102a-c with the bandwidth necessary to transmit audio at the standard rate provided by the system. For example, in a DECT system, audio is encoded at 32 kbps. The system can then be configured such that one timeslot per data frame provides 32 kbps of bandwidth. The DECT system provides a total of 24 timeslots, split evenly between uplink and downlink, which enables it to support 12 handsets simultaneously. In the DECT system, the uplink time portion 204 is the same size as the downlink time portion 206. However, in other systems the uplink and downlink may have different sizes.

Each timeslot 208 is subdivided to support the TDMA system. Each timeslot 208 includes a preamble section 210, which is a period during which no data is transmitted in either direction. TDMA systems include the preamble section 210 because the clocks on the cordless telephone base station 106 and the cordless telephone handsets 102a-c are not perfectly synchronized. Thus, in the uplink, the preamble section 210 ensures that the handsets do not transmit simultaneously by providing a period between the time when a first handset stops transmitting and the time when a second handset starts transmitting. The timeslot 208 also includes a synchronization field 212. The synchronization field 212 contains a known sequence that is transmitted at the beginning of every timeslot 208. The receiver uses the known sequence to ensure that its clock is synchronized with the transmitter clock. The timeslot 208 includes an A field 214, which specifies the type of the content in the B field 218. The B field 218 transmits the actual information, which may be voice or data. The A field 214 includes a cyclic redundancy check (CRC) field 216. The B field 218 includes a CRC field 220. The receiver uses the CRC fields 216 and 220 to detect errors in the associated data field.

The prior art systems have several problems. A typical audio TDMA system allocates a single transmit timeslot to each cordless telephone handset 102a-c. In these systems, resources may be underused if there are fewer handsets than available timeslots. For example, in a cordless phone system, there might only be one or two handsets in use, resulting in as many as 10 timeslots being wasted in every data frame 202. In addition, prior art systems generally use strong CRC protection for the A field 220 with weaker CRC protection for the B field. Because the CRC field 226 only provides error detection for the B field 224, the receiver is limited to only discarding the data in the B field 224 if there is an error. Also, the CRC field 226 is generally very short (i.e. 4 or 8 bits). This provides limited detection capabilities that may fail in the presence of significant interference. In those cases, the errors are passed on to the earpiece, resulting in audible noise or clicking sounds.

The error concealment system mitigates these problems by allocating multiple timeslots 208 to a single handset. The system uses the extra timeslots to transmit redundant data, which can be used to conceal transmission errors. The implementation of this will be discussed in greater detail below.

Figure 3:
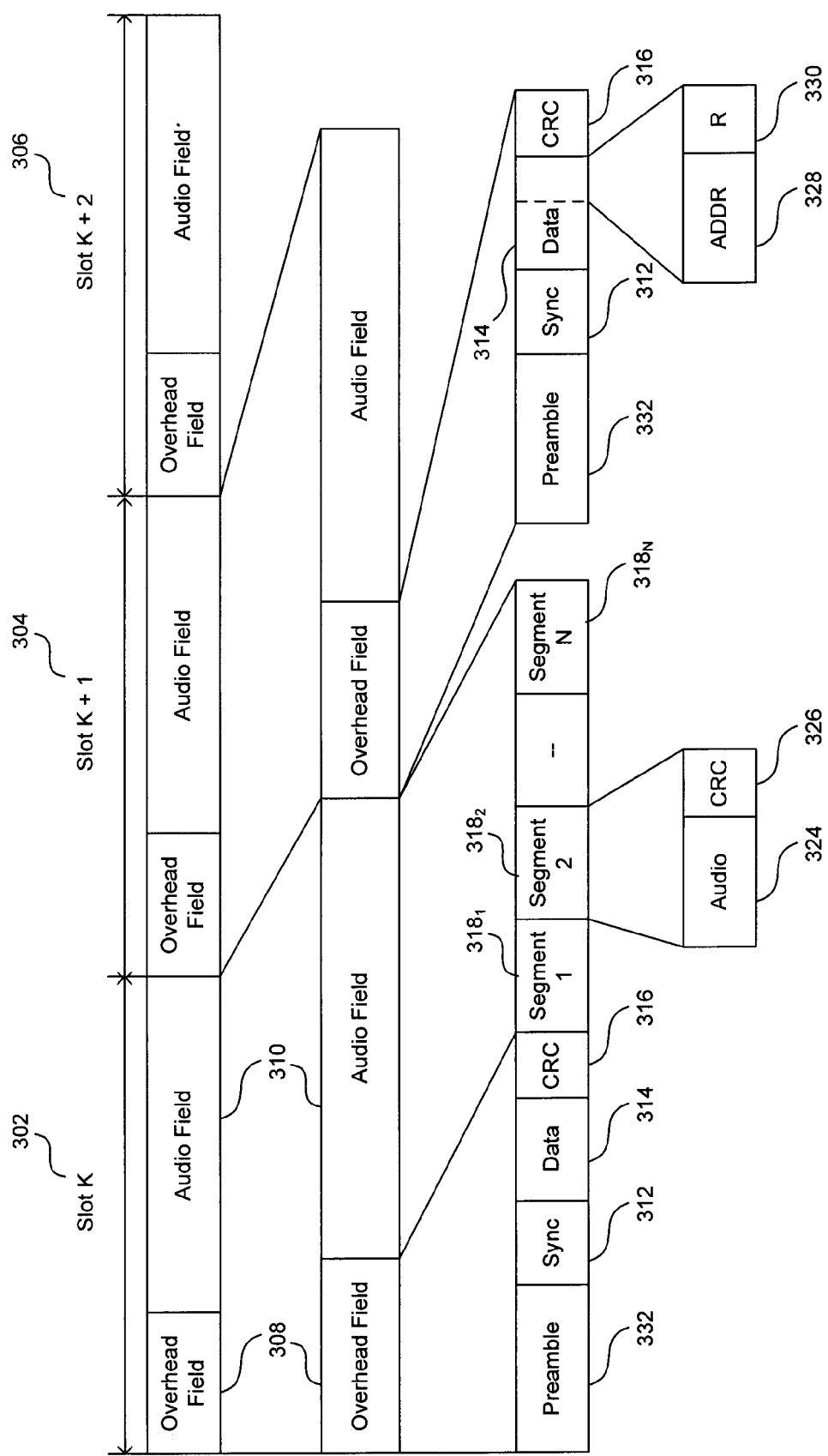
FIG. 3 is a diagram of a data frame configuration suitable for use in an error concealment system.

FIG. 3 shows a data frame structure suitable for use in an error concealment system. The figure shows three successive timeslots 302, 304, and 306 in a data frame such as the one shown in FIG. 2. The basic divisions of the data frame 302 are similar to the divisions of the DECT system shown in FIG. 2. The timeslots 302, 304, and 306 each have an audio field 310, which is equivalent to the B field 224 shown in FIG. 2. The timeslots also have an overhead field 308, which contains a preamble 332, a synchronization field 312, and an overhead data field 314. The overhead data field 314 has an associated CRC field 316, which provides error detection as discussed above. However, unlike the DECT system, the error concealment system divides the audio field 310 into N equal-sized segments $318_1$-$318_N$. Each segment 318 is divided into an audio data field 324 and a CRC field 326, which is used to detect errors in the audio data field 324 for that particular segment. In some embodiments, the system is implemented using the frame structure of the DECT system. In these embodiments, the audio field 310 has 324 bits. Each segment can be 9 bits long, with an 8-bit audio data field 324 and a 1-bit CRC field 326. Each timeslot 302 would then have 36 segments in it. Of course, other configurations could also be used. Although the payload of each timeslot 302 is described as audio data, one skilled in the art will appreciate that the error concealment system could be used with any type of data. In this configuration, each timeslot has an overhead field 308 and a data field that is divided into one or more data segments.

In addition, each handset in the system is assigned a unique address. The overhead data field 314 includes an address field 328 for transmitting this address. In a downlink timeslot, the base station places the unique address of the receiving cordless telephone handset 102 in the address field 328 to distinguish between recipients. The overhead data field 314 also includes an R field 330, which is used to indicate whether the current timeslot is a redundant timeslot. The R field 330 is set to zero if the current timeslot is the main timeslot, while it is set to one if the current timeslot is a redundant timeslot. Thus, each receiver collects all data where the address field 328 contains its unique address. The receiver then uses the contents of the R field 330 to determine whether the data is the original or a redundant copy.

A similar system could also be used for the uplink. In an uplink timeslot, the transmitting handset includes its address in the address field 328 to inform the base station of the source. The base station can then collect all data transmitted from that handset during the data frame and can process the data according to the error concealment system in the same way as with the downlink.

Figure 4A:
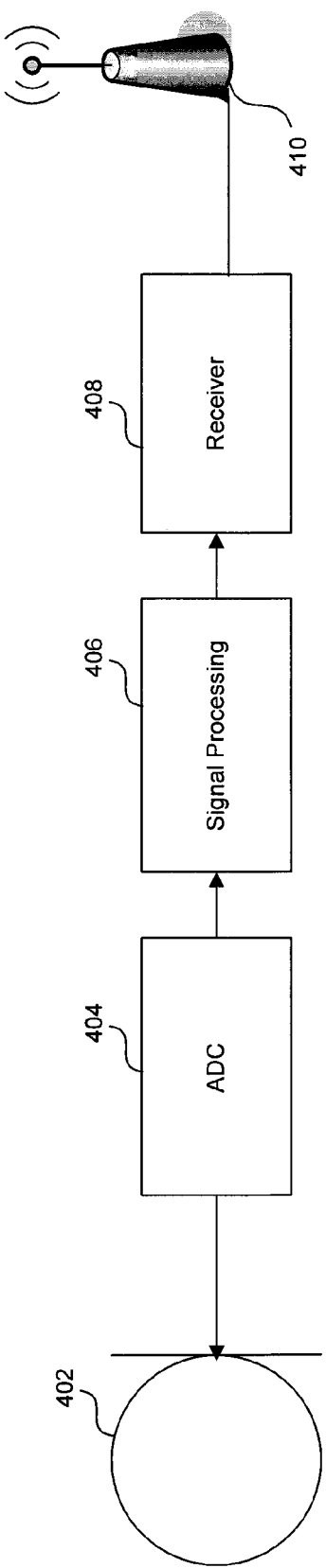
FIG. 4A is a block diagram of a wireless telephone handset suitable for implementing an error concealment system.

FIG. 4A is a block diagram showing a cordless telephone handset 102 suitable for implementing a noise floor reduction system. The system includes an antenna 410, which receives a signal from the base station. The antenna sends the signal to the receiver 408, which demodulates the signal. This can be done according to any well-known modulation method. For example, the DECT system generally uses Gaussian Frequency-Shift Keying (GFSK).

After the receiver 408 demodulates the received signal, the signal is sent to the signal processing module 306. The signal processing module 306 executes various types of signal processing, such as filtering and automatic gain control (AGC). The error concealment system may be implemented at this stage in combination with these other signal processing techniques.

After signal processing is complete, the processed signal is sent to the Digital-to-Analog Converter (DAC) module 404, which converts the digital signal into an analog electrical signal representing the received audio. The converted signal is then sent to the speaker 402, which converts the analog electrical signal into an audio output.

Figure 4B:
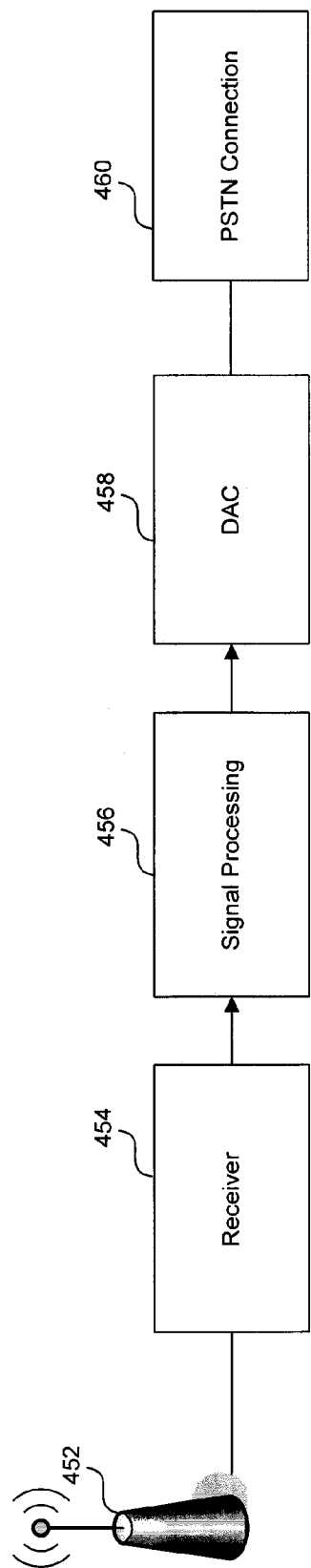
FIG. 4B is a block diagram of a wireless telephone base station suitable for implementing an error concealment system.

FIG. 4B is a block diagram showing a cordless telephone base station 106 suitable for implementing an error concealment system. In an alternate embodiment, the designer may choose to place the signal processing in the cordless telephone base station 106, rather than in the cordless telephone handset 102. Because the system provides error concealment by adding additional processing at the receiver, both the handset and the base station could benefit by including the processing.

The cordless telephone base station 106 contains an antenna 452 which receives a signal from the handset. The antenna 452 sends the signal to a receiver 454, which demodulates the received signal. The demodulated signal is sent to signal processing module 456, which can be configured to provide similar functions to the signal processing module 406 found in the cordless telephone handset 102. The signal processing module 456 sends the processed signal to the DAC 458, which converts the digital samples to an analog signal that can be sent through the PSTN connection 460.

Figure 5:
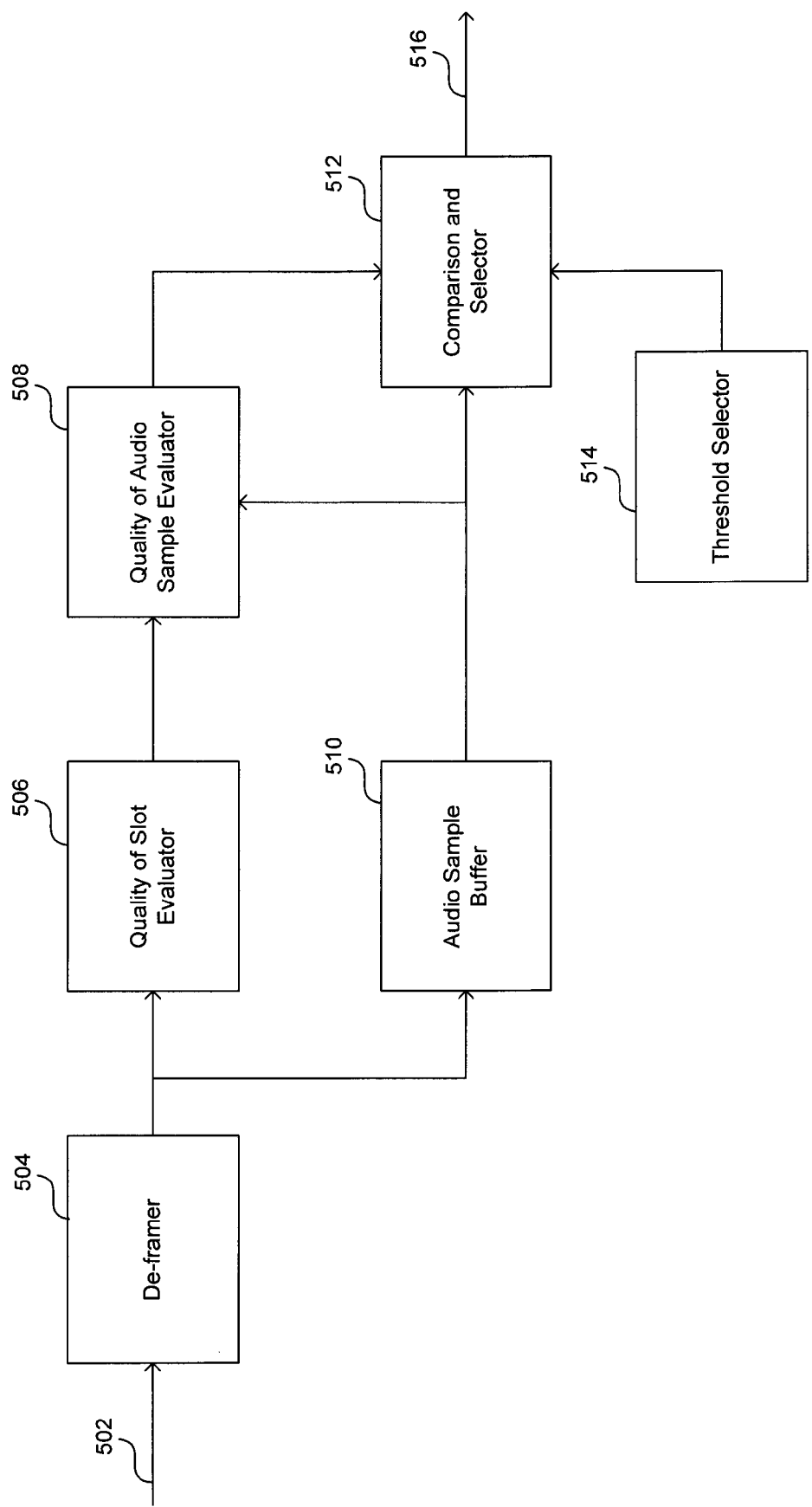
FIG. 5 is a block diagram of an implementation of the error concealment system.

FIG. 5 is a block diagram of an implementation 500 of the error concealment system. The system receives data from an input bitstream 502. The input bitstream 502 is received from earlier components in the system, such as the receiver 408 in the cordless telephone handset 102 or the receiver 454 in the cordless telephone base station 106. The input bitstream 502 is sent to the De-framer module 504. The De-framer module 504 unpacks the various elements of the input data frame, including the synchronization field 312, the overhead data field 314, and the audio segments $318_1$-$318_N$. The De-framer module 504 also unpacks the CRCs 316 and 326 associated with the overhead data field 314 and the audio segments $318_1$-$318_N$.

The De-framer module 504 sends the unpacked data to the audio segment buffer (ASB) module 510. The ASB module 510 stores the audio segments $318_1$-$318_N$ from each received timeslot. In the case of redundant timeslots, the ASB module 510 stores all copies of the audio segments $318_1$-$318_N$ and further stores metadata noting which timeslot carried each copy of the stored audio segments.

The fields of the timeslot are also sent along to the Quality of Slot Evaluator (QoSE) module 506, which evaluates the quality for each received timeslot. As will be described below, the QoSE module 506 calculates a quality score for each timeslot.

The Quality of Audio Segment Evaluator (QoASE) module 508 and the Comparison and Selector (CS) module 512 operate to select the best quality audio segment from the redundant copies. Because they work with all redundant copies, they begin processing at the end of the data frame 202, when all redundant copies of have been received. The QoASE module 508 calculates an audio segment quality score for each audio segment using the calculated slot quality score received from the QoSE module 506 and the redundant copies stored in the ASB module 510.

The comparison and selector (CS) module 512 receives stored audio segments from the ASB module 510 and the calculated quality of audio segment scores from the QoASE module 508. The CS module 512 uses the calculated quality scores to determine which of the audio segments to select from the received copies.

In some embodiments, after selecting the segment with the highest score, the system immediately outputs the selected segment as output signal 516. The output signal is then sent on to later stages of the system. In other embodiments, the system includes a Threshold Selector module 514, which provides a quality threshold to the CS module 512. In these embodiments, the CS module compares the quality score of the selected segment to the threshold. If the quality score is below the threshold, the CS module 512 instead outputs a mute sample by, e.g. outputting all zeros. The Threshold Selector module 514 can set the threshold in a number of ways. For example, the threshold might be hard-coded to a certain value. A designer might choose this value based on experimental analysis of the various configurations in which the system might be deployed. Alternatively, the system could adaptively set the threshold based on the noise in the channel or the number of segments that are determined to be in error.

Figure 6:
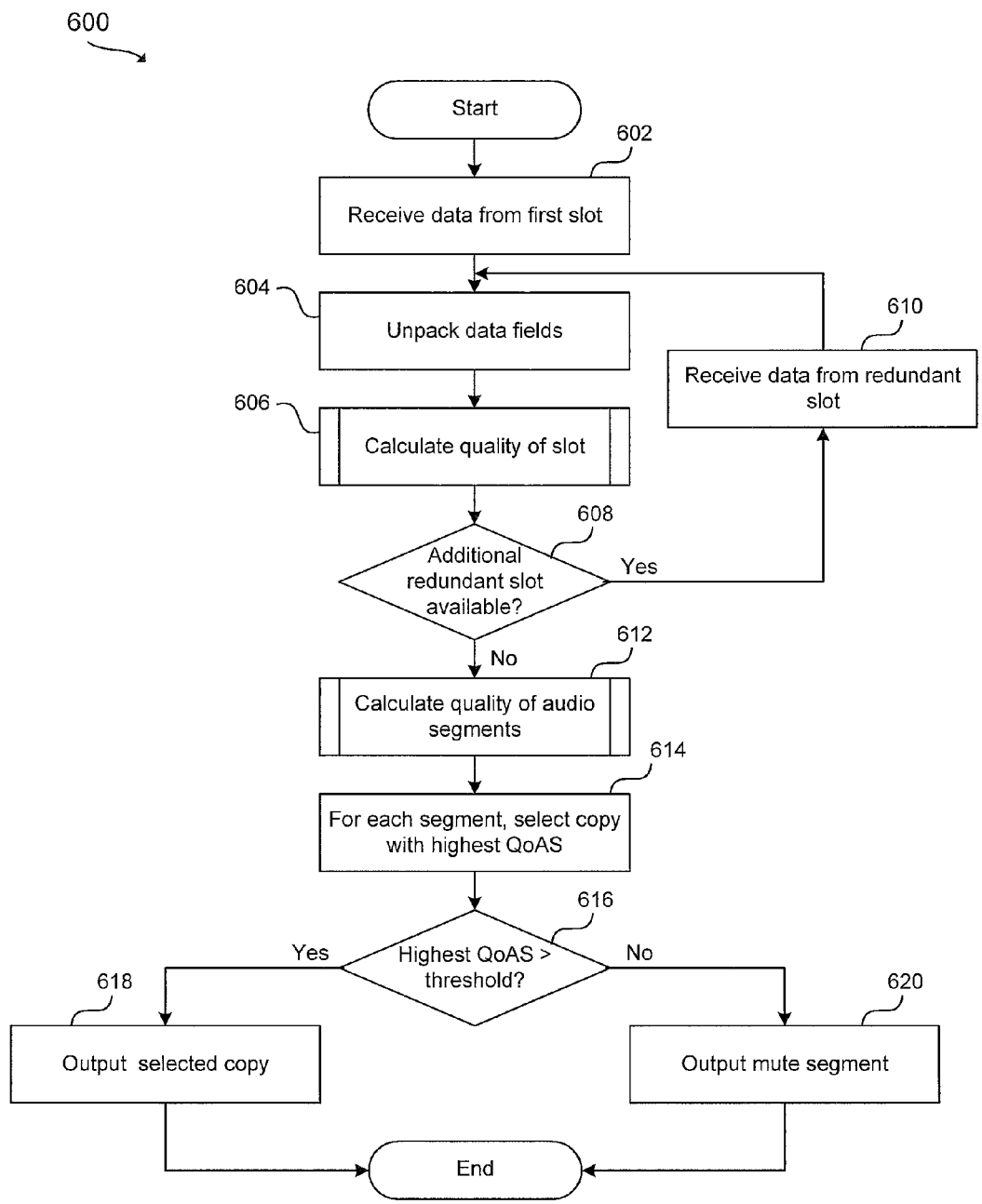
FIG. 6 is a flow chart of a process implemented by the error concealment system for selecting and outputting data segments.
Figure 7:
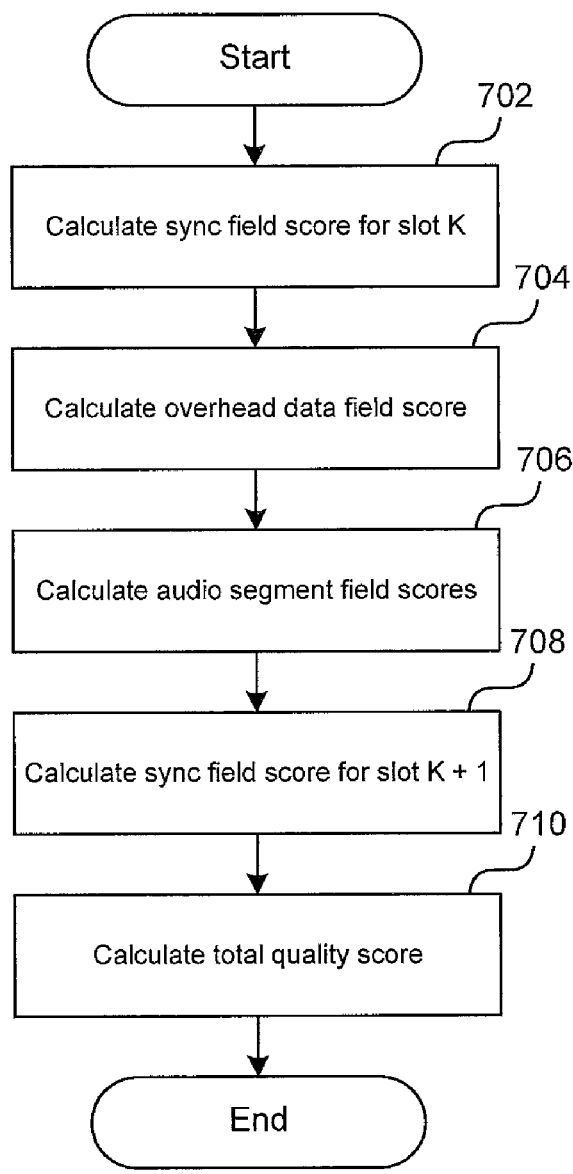
FIG. 7 is a flow chart of a process implemented by the error concealment system for evaluating the quality of a timeslot.
Figure 8:
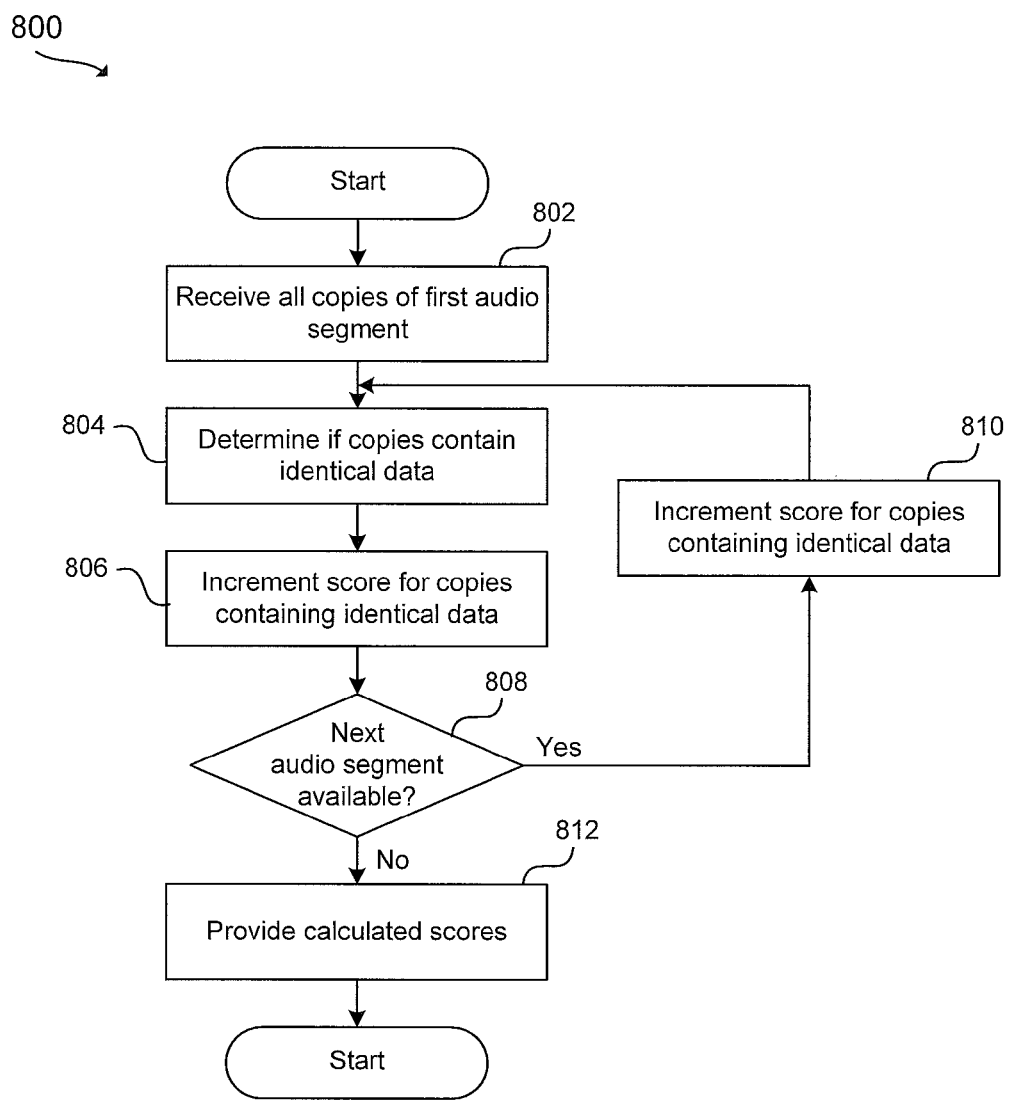
FIG. 8 is a flow chart of a process implemented by the error concealment system for evaluating the quality of an audio segment.

FIGS. 6-8 are flow charts of a process for implementing an error concealment system. FIG. 6 is a flow chart of a process 600 implemented by the error concealment system for selecting audio segments to output. FIGS. 7 and 8 provide additional details for particular aspects of the flow chart of FIG. 6. Although the process is described in the context of the system in FIGS. 3 and 4, it could also be implemented using other system configurations.

At block 602, the system receives the data contained in the first timeslot sent by a transmitter (i.e. either a cordless telephone handset 102 or a cordless telephone base station 106). The system then proceeds to block 604, where the De-framer module 504 unpacks the fields from the received timeslot. In this block, the ASB module 510 also buffers the received audio segments. The unpacked fields are used in block 606, where the system calculates a quality score for the timeslot. A process for calculating this score is detailed below with reference to FIG. 7.

After the quality of the timeslot is calculated, the system proceeds to decision block 608, where it determines if the same transmitter sent redundant copies of the timeslot. If redundant copies are available, the system proceeds to block 610, where it receives the data from a redundant timeslot. The system repeats the processing of blocks 604-610 until it has processed the data from all redundant timeslots.

After the system has processed all of the data from a single transmitter, it proceeds to block 612, where it calculates the quality of each of the audio segments. The quality of the audio segments is calculated as a score that estimates the quality of the received audio based on a comparison of the multiple received audio segments. A process for calculating this score is detailed below with reference to FIG. 8.

After the system calculates the score for the audio segments, it proceeds to block 614, where it determines which copy of each audio segment has the highest quality of audio segment score. The system then repeats the determination for each audio segment in the transmitted timeslot. Using this method, the system selects each audio segment independently, so segments can be chosen from several different transmitted copies of the timeslot. For example, the system could select segment 1 from timeslot K while using segments N−1 and N from timeslot K+1.

For each audio segment, after the copy with the highest score is selected, the system proceeds to decision block 616, where it determines if the QoAS score of the selected copy is greater than a specified threshold. If the score is greater than the threshold, the system proceeds to block 618, where it outputs the selected copy to the next stage of processing. If the score is less than the threshold, the system proceeds to block 620, where it instead outputs a mute segment. As discussed above, in some embodiments, the system does not compare the quality score to a threshold. In these embodiments, the system immediately outputs the selected copy to the next stage of processing without inserting any mute segments.

FIG. 7 is a flow chart of a process 700 implemented by the error concealment system for evaluating the quality of a timeslot. The process 700 may be used by the system to implement the processing of block 606 in FIG. 6, although other methods may also be used to evaluate the quality of a timeslot.

Processing begins at block 702, where the system calculates the score for the synchronization field 312 of timeslot K 302. The synchronization field 312 contains a predetermined bit sequence that the receiver uses to synchronize its clock with the transmitter clock. Therefore, to evaluate the score for the synchronization field 312, the system compares the received bit sequence to the predetermined synchronization bit sequence. If the sequences match, the system assigns the maximum score. The system assigns a lower score if there are mismatched bits and assigns a score of zero if the number of mismatched bits exceeds a threshold value. In some embodiments, the system assigns a score of 1 if the bits match and a score of 0 if any bits differ.

After the system evaluates the score for the synchronization field 312 for timeslot K, it proceeds to block 704, where it calculates the score for the overhead data field 314. The system determines the score by checking the CRC field 316 against the overhead data field 314. CRC checks are well known in the art and will not be further described here. If the data field passes the CRC check, the system assigns a positive number to the score. If the data field fails the CRC check, the system assigns a score of zero. In some embodiments, the system assigns a score of 1 if the overhead data field 314 passes the CRC check.

After the system evaluates the score for the overhead data field 314, it proceeds to block 706, where it calculates the score for each of the audio segments $318_1$-$318_N$. The system calculates the score separately for each audio segment $318_1$-$318_N$ by performing a CRC check. If the audio segment $318_1$-$318_N$ passes the CRC check, the system assigns a positive score. If the segment fails the CRC check, the system assigns a score of zero. As with block 704, in some embodiments, the system assigns a 1 if the audio segment $318_1$-$318_N$ passes the CRC check.

After the system evaluates the score for the audio segments, it proceeds to block 708, where it evaluates the score for the synchronization field 312 for timeslot K+1. Evaluating the second synchronization field 312 allows the system to better detect a burst of errors occurring near the end of the audio segment and spilling over into the following synchronization field 312. In some embodiments, the system only uses fields in the current segment to determine the QoS score. In these embodiments, the system skips block 708.

After the system evaluates the score for the second synchronization field 312, it proceeds to block 710, where it calculates a total quality score. The total quality score is calculated according to the formula:

$$QoS(K) = S_S(K) + S_d(K) + \sum_{n=1}^{N} S_a(n, K) + S_s(K+1),$$

where QoS(K) is the total quality score of timeslot K, $S_s(K)$ is the calculated score for the synchronization field of timeslot K, $S_d(K)$ is the calculated score for the overhead data field of timeslot K, and $S_a(n,K)$ is the calculated score for the nth audio segment of timeslot K. Thus, the score is the sum of the values calculated in blocks 702-708.

FIG. 8 is a flow chart of a process 800 implemented by the error concealment system for evaluating the audio quality of the audio segments for a timeslot. The process 800 may be used by the system to implement the processing of block 612 in FIG. 6, although other methods may also be used to evaluate the quality of an audio segment. The system applies the steps of the process 800 to generate a QoAS score for each audio segment $318_1$-$318_N$.

Processing begins at block 802, where the system receives all copies of the first audio segment. The system then proceeds to block 804, where it determines if any of the received copies contain identical data to other copies. If two segments contain the same data, the system increments the quality score, because it is unlikely that the same error would occur in multiple copies of the same segment. The system assigns a lower score if a segment has a small number of mismatched bits and assigns a score of zero if the number of mismatched bits exceeds a threshold value. In some embodiments, the system assigns a score of 1 if the bits match and a score of 0 if any bits differ. After the system determines which copies contain identical data, it proceeds to block 806, where it increments the scores for these copies. Each copy of an audio segment has a starting score equal to the QoS score for the timeslot that the segment came from. When there is a match, the system adds an additional score to generate a final score for the segment. In one embodiment, the system adds one for each matching segment.

After generating the scores for the first audio segment, the system proceeds to decision block 808, where it determines if additional audio segments are available. That is, if the system has just determined scores for the first segment $318_1$, it proceeds to the second segment $318_2$. If additional segments are available, the system proceeds to block 810, where it receives all copies of the next audio segment. The system then repeats blocks 804-808 until it has generated a QoAS score for every audio segment. It then proceeds to block 812, where it provides the calculated values for the next step in the system.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method for reducing error in a communication system, comprising:
   receiving a plurality of copies of a data segment, wherein the copies differ from one another;
   calculating a segment quality value for each received copy of the data segment, wherein calculating further comprises:
      comparing the copy to the other copies of the data segment; and
      deriving the segment quality value based on the results of the comparison;
   selecting one of the plurality of copies of the data segment based on the calculated segment quality values; and
   outputting the selected copy
   wherein each copy of the data segment is contained in a timeslot comprising an overhead field and a data field, the data field having one or more data sub-segments;
   calculating a timeslot quality value for each timeslot, wherein the segment quality value for an individual copy of a data segment is calculated based on the calculated timeslot quality value for the timeslot containing the individual copy of the data segment
wherein calculating a timeslot quality value comprises
calculating an overhead quality value for the overhead field;
calculating a data quality value for each of the one or more data segments in the data field of the timeslot; and
generating the transmission quality value by adding the calculated overhead quality value and the calculated data quality values.

2. The method of claim 1, wherein calculating an overhead quality value comprises:
performing a cyclic redundancy check on the overhead field;
assigning a first value to the overhead quality value if the overhead field passes the cyclic redundancy check; and
assigning a second value to the overhead quality value if the overhead field fails the cyclic redundancy check.

3. The method of claim 1, wherein calculating an overhead quality value comprises:
comparing the overhead field to an expected bit sequence;
assigning a first value to the overhead quality value if the overhead field is substantially similar to the expected bit sequence; and
assigning a second value to the overhead quality value if the overhead field is not substantially similar to the expected bit sequence.

4. The method of claim 1, wherein the plurality of copies are received in separate timeslots of a TDMA data frame.

5. The method of claim 1, wherein outputting the selected copy further comprises:
if the segment quality value of the selected copy is greater than a quality threshold, outputting the selected copy;
if the segment quality value of the selected copy is not greater than the quality threshold, outputting a mute data segment.

6. The method of claim 1, wherein the data segment contains audio data.

7. A method for reducing error in a communication system, comprising:
receiving a plurality of copies of a data segment, wherein the copies differ from one another;
calculating a segment quality value for each received copy of the data segment,
wherein calculating further comprises:
comparing the copy to the other copies of the data segment; and
deriving the segment quality value based on the results of the comparison;
selecting one of the plurality of copies of the data segment based on the calculated segment quality values; and
outputting the selected copy,
wherein each copy of the data segment is contained in a timeslot comprising an overhead field and a data field, the data field having one or more data sub-segments
calculating a timeslot quality value for each timeslot, wherein the segment quality value for an individual copy of a data segment is calculated based on the calculated timeslot quality value for the timeslot containing the individual copy of the data segment, wherein calculating the segment quality value for a received copy of the data segment comprises:
assigning an initial value equal to the calculated timeslot quality value for the timeslot containing the received copy;
determining if another copy of the data segment contains data that is substantially similar to the data of the received copy; and
if another copy is determined to contain substantially similar data, generating the segment quality value for the received copy by adding a first value to the initial value;
if no other copy is determined to contain substantially similar data, generating the segment quality value for the received copy by adding a second value to the initial value.

* * * * *